(12) United States Patent
Mehlhaf (10) Patent No.: US 6,948,669 B1
(45) Date of Patent: Sep. 27, 2005

(54) APPARATUS FOR MIXING AND AERATING MATERIAL

(76) Inventor: Charles E. Mehlhaf, 212 N. Main St., Freeman, SD (US) 57029

(*) Notice: Subject to any disclaimer, the term of this patent is extended or adjusted under 35 U.S.C. 154(b) by 334 days.

(21) Appl. No.: 10/186,580

(22) Filed: Jun. 28, 2002

(51) Int. Cl.$^7$ ............................................. B02C 19/00

(52) U.S. Cl. ................................. 241/101.742; 384/114

(58) Field of Search .................... 241/101.74, 107.742; 384/114

(56) References Cited

U.S. PATENT DOCUMENTS 4,451,371 A * 5/1984 Peck .......................... 210/325

* cited by examiner

*Primary Examiner*—Mark Rosenbaum
(74) *Attorney, Agent, or Firm*—Sheridan Ross P.C.

(57) ABSTRACT

This invention generally relates to reduction drive assemblies and, more particularly, to belt and pulley reduction drive assemblies and related support structure for portable equipment to mix and aerate materials. The support structure is adapted to provide support to a jack shaft and any associated bearing assemblies and to facilitate adjustment and tightening of various components of the reduction assembly.

34 Claims, 5 Drawing Sheets

APPARATUS FOR MIXING AND AERATING MATERIAL

FIELD OF THE INVENTION

This invention generally relates to reduction drive assemblies and, more particularly, to belt and pulley gear reduction drive assemblies and related support structure for portable equipment to mix and aerate materials.

BACKGROUND OF THE INVENTION

Composting is a process of converting organic and other waste materials into a useful or more valuable commodity. A common application of composting is the aerobic decomposition of waste products from animals, plants or other organic material, resulting in fertilizer ingredients and other soil conditioners. Waste treatment plants also commonly employ composting to treat sewage sludge, often by mixing additional ingredients to facilitate the process. Landfills also may compost various materials. Remediation of contaminated soils is a process to clear the soil of unwanted contaminants and requires mixing and aerating the soil.

Regardless of the application, composting generally requires the availability of oxygen for the aerobic decomposition process. Where the material is not exposed to oxygen, or is exposed to insufficient amounts of oxygen, the decomposition process does not proceed or becomes much less efficient. In smaller scale operations, such as a backyard garden, one may expose the waste material to oxygen by periodically mixing it and exposing it to the surrounding air. In larger scale operations, the process of mixing and aerating the waste material becomes more problematic.

In a commercial or other large scale operation, the material desired to be composted typically is positioned into long rows of generally conically-shaped piles, referred to as windrows, that are relatively consistent in width and in maximum height. The windrows may be constructed by positioning the material into rows on a field by dump trucks, front end loaders, conveyors or other moving equipment. If the material is simply left undisturbed in these windrows, the aerobic decomposition may proceed satisfactorily in some parts of the windrow, but would not do so uniformly within the windrows. The larger the windrow, the greater the amount of material that rests in pockets that are not adequately exposed to oxygen.

In addition to the need to mix and aerate the material itself, one may wish to mix into the windrow additional materials to aid in the decomposition process or to create a desired end product. For example, if treating sewage sludge with a relatively high concentration of nitrogen, one may wish to add other materials, such as wood chips. Similarly, remediation of contaminated soils may advantageously mix certain materials into the windrow to enhance the process.

To enhance aerobic decomposition and soil remediation, a compost turner may be used to mix and aerate the materials. A compost turner is a portable machine designed to travel over a windrow of a certain width and height and, using a rotating horizontal drum with blades or other edges, mix the material in the windrow and expose more of the material to the surrounding air. For the composting and remediation processes to proceed most efficiently, the material should be regularly and thoroughly mixed and aerated by the compost turner.

For commercial or other large scale composting or remediation operations, the windrow may be as small as a few feet high and several feet wide, or may be much larger. As the width and height of the windrow increases, the horsepower requirements of the compost tuner increase significantly. For example, in a relatively smaller commercial windrow having a maximum height of about approximately 5 feet high and a maximum width of approximately 14 feet, the compost turner may require an engine of approximately 250 to 300 horsepower to adequately mix and aerate the material in the windrow. In contrast, a larger windrow of 6 feet high and 20 feet wide may require a compost turner with an engine having 350 to 600 horsepower or more. With compost turners of higher horsepower, e.g., approximately 350 to 600 horsepower or more, the limiting operating factor becomes the ability of the drive assembly to reliably transfer the engine's power to the drum, at an amount of torque and revolutions per minute that will satisfactorily turn the rotating drum.

As the capacity of the compost turner increases, the rotating drum generally increases in size and weight. For a relatively larger compost turners, the drum may reach 5,000 to 6,000 pounds or more. This adds to the forces on the drive system, particularly when the drum shaft is first engaged. A typical clutch mechanism generally is insufficient to reliably engage such a heavy drum over time.

Due to the relatively high horsepower requirements of commercial and other large scale composting, most current self-propelled compost turners employ a hydraulic drive, rather than a clutch mechanism, to engage the drive shaft. However, hydraulic drives are relatively inefficient in transferring horsepower from the engine to a shaft. For example, in these applications, hydraulic drives typically lose at least 15% and perhaps up to 25–30% of available horsepower. Also, hydraulic drives generate a significant amount of heat, which must be dissipated. This mechanism also is relatively complicated, resulting in relatively more frequent and expensive maintenance and replacement.

Another approach is to use a fluid coupler, which advantageously is capable of relatively slowly starting a high inertia load, such as a large drum of a higher capacity compost turner. Fluid couplers are generally very efficient and also are better able to handle a shock load. For example, if the rotating drum of a compost turner were to strike an immoveable object, a fluid coupler may allow the drum to slow or even stop rotating, without stopping the engine.

To power the rotating horizontal drum of the compost turner, typically the engine is used to rotate a drive shaft, which eventually is used to rotate a drum shaft which rotates the drum. A variety of mechanisms may be used to transfer the power from the rotating drive shaft to the drum shaft. One type of mechanism is a belt and pulley system, which typically employs a V-belt connected to a pulley having a V-grooved surface. These types of belt are susceptible to a relatively large amount of stretching, which leads to slippage and inefficient power transfer. As such, they must be tightened periodically and significantly. Also, the alignment of these belts must be within close parameters and closely monitored, to reduce the tendency of the belts to ride off the pulley.

This type of belt and pulley system for reduction generally is better equipped for relatively lower horsepower applications with higher revolutions per minute, such as those having less than approximately 300 horsepower or so. As the horsepower of the compost turner increases and the drum revolutions per minute decreases, higher torque is achieved and the V-belts must be increased in width and/or in number to handle the increased loads. For example, for a compost turner having an engine generating approximately 350 horsepower, such a belt and pulley system may require a V-belt, or a combination of V-belts, to have a width of about 12 inches or greater. This results in greater likelihood of slippage and misalignment, more difficulties in tightening and alignment, decreased efficiency, increased size of the assembly and other design problems resulting from a larger pulley system to handle the width and/or number of belts. For example, the sheer width of the V-belt and pulley system can create a relatively long overhang on a shaft, which places greater pressure on associated bearings and other support structure. At about 350 horsepower or greater and at lower revolutions per minute, the resulting higher torque typically will cause V-belt drive systems to fail.

To address the shortcomings of the V-belt and pulley system, a synchronous poly belt and related pulley system has been employed. A synchronous poly belt generally includes a sequence of rows of teeth and grooves designed to engage corresponding rows of grooves and teeth on the pulleys. The poly belts are typically made of polymers and are stronger and less susceptible to stretching than V-belts. As such, poly belts generally are capable of handling greater horsepower at lower revolutions per minute than V-belts. Also, the engagement of the teeth and groves between the poly belt and the pulleys results in no slippage, less horsepower loss and overall a more efficient power transfer.

Whether using a V-belt or a poly belt system, the horsepower generated by the engine must be transferred to start and maintain the rotation of the drum of the compost turner. To do so, it is advantageous to conduct a reduction, i.e., reduce the revolutions per minute and increase the torque, in order to overcome the inertia of the drum and rotate the drum at the desired, lower revolutions per minute. In theory, this may be accomplished in a single step, with a drive shaft connected by the pulley and belt system directly to a drum shaft. In applications such as the compost turners described herein, a single step reduction would place inordinate stress on the drive assembly and require unacceptably large and unwieldy components. As such, a two step reduction process may be employed, where the drive shaft is connected by the poly belt and pulley system to a jack shaft, which in turn is connected by a second poly belt and pulley system to the drum shaft.

Generally, a jack shaft rotates around a bearing assembly, which is connected to a portion of the frame of the compost turner. With a pulley at one end of the jack shaft connected by a belt to a pulley on the drive shaft, the jack shaft and the bearing assembly are subjected to forces in the direction of the drive shaft when the drive shaft is engaged. As the amount of horsepower increases, the forces on the jack shaft and the bearing assembly increase correspondingly. Also, the jack shaft includes a pulley connected by a belt to a pulley on the drum shaft. This results in forces on the jack shaft and bearing assembly in the direction of the drum shaft, when the drive shaft is engaged. For compost turners of relatively larger capacity, e.g., those with horsepower of approximately 350 or greater, these forces are relatively large and are difficult for existing jack shaft and bearing assembly systems to handle.

One approach for such larger capacity compost turners has been to place one or more bearing assemblies near the middle of the jack shaft, with the pulley to the drive shaft on one side and the pulley(s) to the drum shaft on the other. While this approach may be suitable for many applications, it is less reliable and durable than desired for commercial and other large scale composting operations. That is, a single bearing assembly, or even a pair of bearing assemblies, positioned between the pulley to the drive shaft and the pulley(s) to the drum shaft have been found to be insufficient to handle the loads imposed by such larger capacity compost turners, such as those having approximately 350 horsepower or greater.

As such, a need exists for an improved reduction assembly for a compost turner or other equipment operating at relatively higher horsepower and requiring reduction resulting in lower revolutions per minute and greater torque, e.g., to start and maintain the rotation of the revolving drum of a commercial compost turner.

DETAILED DESCRIPTION OF THE INVENTION

This invention generally relates to reduction drive assemblies and, more particularly, to belt and pulley reduction drive assemblies and related support structure for portable equipment to mix and aerate materials, including self-propelled, tow-along and other portable compost turners.

Figure 1:
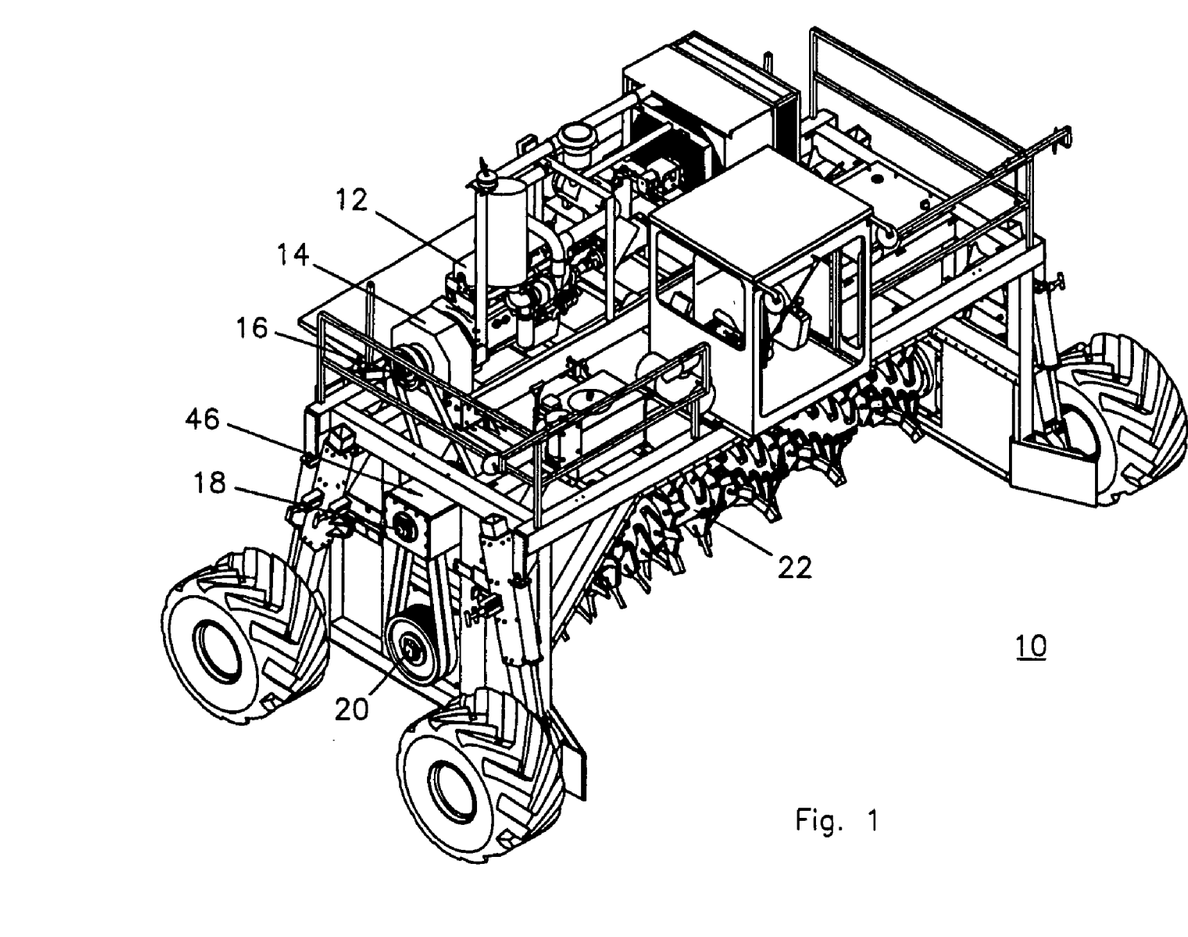
FIG. 1 is a perspective view depicting a compost turner including one embodiment of a reduction assembly of the present invention.

Referring to FIG. 1, a self-propelled compost turner 10 comprises an engine 12 connected to a transfluid coupler 14, which turns a drive shaft 16. To reduce the amount of rotational speed, commonly expressed in revolutions per minute, and to increase torque, the drive shaft 16 is connected to a jack shaft 18, which in turn is connected to the drum shaft 20. The drum shaft 20 then turns the drum 22, which performs the desired function of mixing and aerating the material.

As described above, a typical commercial compost turner may operate at approximately 200 to 600 horsepower or greater, resulting in drive shaft rotational speeds of approximately 2,000 revolutions per minute or greater. As the capacity of the compost turner is increased, the size and mass of the rotating drum generally increases, which requires greater horsepower and greater torque to turn than smaller drums with less capacity. For example, a self-propelled compost turner capable of mixing and aerating a windrow of approximately 5 feet high and 14 feet wide may have a drum approximately 42 inches in diameter and weighing approximately 3,500 pounds, and may require an engine having approximately 250 to 300 horsepower. In contrast, to process a windrow approximately 8 feet high and 20 feet wide, the compost turner may require a drum approximately 44 inches in diameter and weighing approximately 7,000 pounds, and may require an engine having approximately 400 to 600 horsepower or more.

At the levels of horsepower required for commercial or other larger scale compost turners, a reduction from the drive shaft to the drum shaft is necessary to transfer the relatively low torque/high revolutions per minute of the drive shaft to the desired relatively high torque/low revolutions per minute of the drum shaft. For a compost turner having a larger capacity, such as one generating approximately 350 horsepower or more, such a reduction may include utilizing a series of pulleys and at least one intermediate rotating shaft, often referred to as a jack shaft. Such a jack shaft rotates around at least one bearing assembly connected to a portion of the compost turner.

As the horsepower and rotational speed of the drive shaft increases, the resulting loads on the components of the reduction assembly also increase significantly. As described above, a prior approach of positioning a single bearing assembly, or even a pair of bearing assemblies, between the pulleys on the jack shaft has been found to be insufficient to handle the loads imposed by such larger capacity compost turners, such as those having approximately 350 horsepower or greater. Even positioning two bearing assemblies adjacent or as close to each other as possible and positioning the pulleys next to the bearings, which was one approach to try to handle the increased loads, was found to be insufficient.

In one embodiment of the present invention, a support structure is provided to support the jack shaft and the associated bearing assemblies. The support structure is connected to a portion of the compost turner and includes a first bearing mount to house a first bearing assembly at a first position along the length of a jack shaft and a second bearing mount to house a second bearing assembly at a second position along the length of a jack shaft. Preferably, the support structure is adjustably connected to the portion of the compost turner and is adapted to provide adjusting and tightening of components of the reduction assembly. More preferably, the support structure is adapted to provide such adjustments and tightening of components with a connector or a set of connectors located in close proximity to each other.

Figure 2:
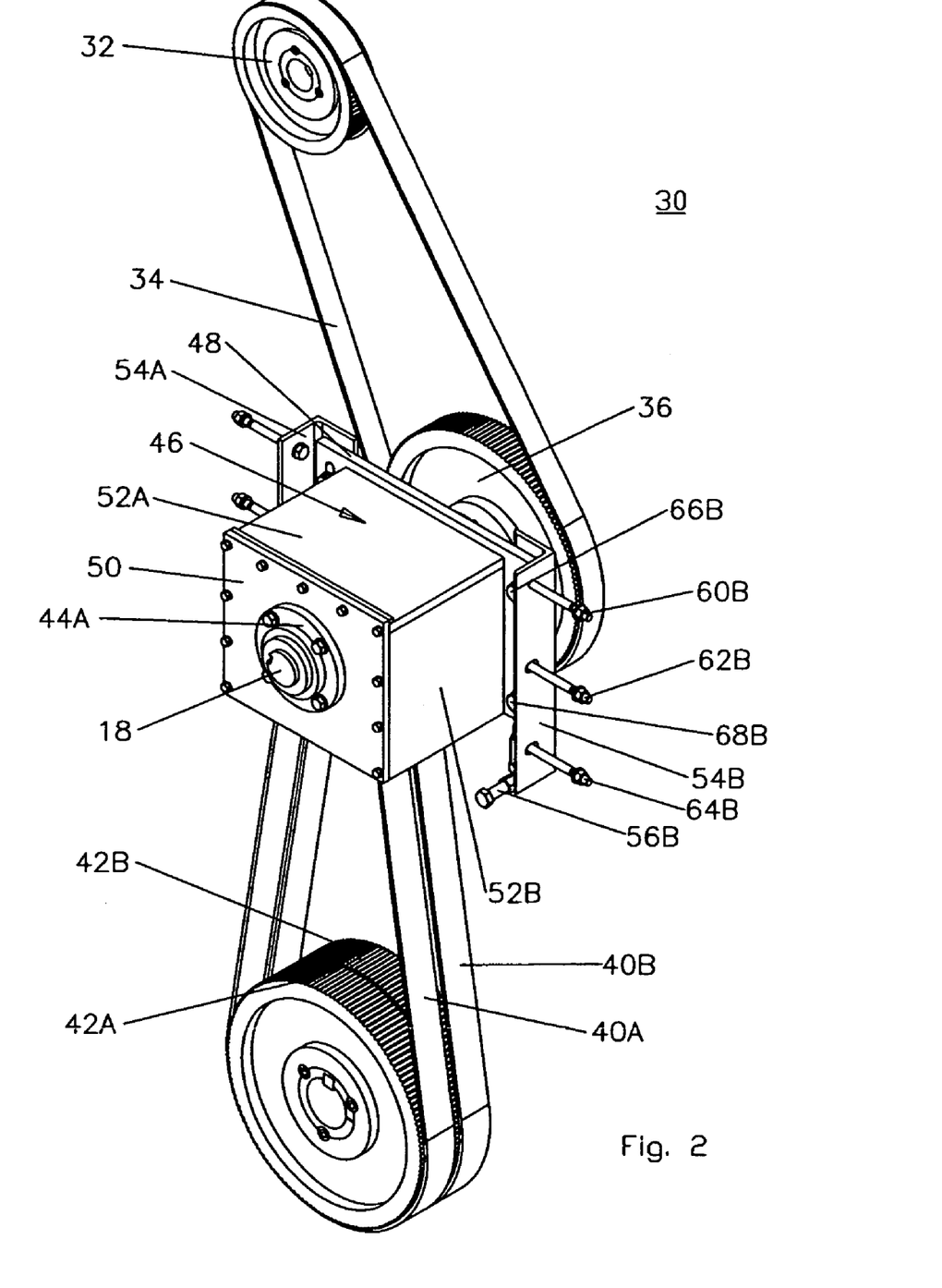
FIG. 2 is a perspective view depicting a portion of one embodiment of a reduction assembly of the present invention.

Referring now to FIGS. 1 and 2, a portion of one embodiment of the reduction assembly of the present invention is depicted. A reduction assembly 30 comprises drive shaft pulley 32, drive shaft belt 34, a first jack shaft pulley 36, jack shaft 18, support structure 46, bearing assembly 44A, a second jack shaft pulley or pulleys 38A, 38B (shown in FIG. 4, 5), jack shaft belts 40A, 40B, drum shaft pulleys 42A, 42B and drum shaft 20.

The drive shaft belt 34 preferably is a synchronous poly belt, such as those available commercially from The Gates Company of Denver, Colo. A synchronous poly belt generally includes a sequence of teeth and grooves designed to engage corresponding grooves and teeth on the pulleys. As shown in FIG. 2, drive shaft pulley 32 and first jack shaft pulley 36 comprise such teeth and grooves. Alternatively, other pulley and belt systems may be employed in the present invention, including V-belts and other systems known in the art. The size and strength of the poly belts depend on the amount of horsepower and the desired capacity of the compost turner. For a compost turner of approximately 400 horsepower, the drive shaft belt 34 preferably is constructed of a durable polyurethane compound, such as a poly belt known as Poly Chain GT2, available from the Gates Company of Denver, Colo. Preferably, the drive shaft belt 34 is approximately 3 inches in width and 46 inches in length, measured from the center of drive shaft 16 to the center of jack shaft 18. Different sized belts, or an additional belt or belts may be added, if necessary for the particular application.

Similarly, the jack shaft belts 40A and 40B preferably are synchronous poly belts, as described above, and the corresponding second jack shaft pulleys 38A, 38B and the corresponding drum shaft pulleys 42A, 42B adapted to engage the synchronous poly belt. Again, other pulley and belt systems may alternatively be employed in the present invention, including V-belts and other systems know in the art. The size and strength of the jack shaft belts also depend on the amount of horsepower and the desired capacity of the compost turner. For a compost turner of approximately 350 to 600 horsepower, the jack shaft belts are preferably constructed of the poly belts, as described above, and are approximately 4 inches in width and 50 inches in length, measured from the center of jack shaft 18 to the center of drum shaft 20.

Due to the forces involved in compost turners of approximately 350 to 600 horsepower or greater and due to the limits of the poly belts currently available commercially and the ratios required to slow the drum 22, it is preferred to use two poly belts for jack shaft belts 40A, 40B, each with a set of corresponding jack shaft pulleys 42A, 42B, as shown in FIG. 2. Alternatively, a single belt may be used, or additional belts may be added, depending on the horsepower employed, the reduction desired, the strength of available belts, and other factors, all as would be recognized by those in the art.

The jack shaft 18 is designed to connect to the first jack shaft pulley 36 and to the second jack pulleys 38A, 38B. The rotating drive shaft 16 thereby rotates the drive shaft pulley 32, engaging the drive shaft belt 34 to rotate the first jack shaft pulley 36, rotating the jack shaft 18, rotating the second jack shaft pulleys 38A, 38B, engaging the jack shaft belts 40A, 40B to rotate the drum shaft pulleys 42A, 42B, rotating the drum shaft 20 and rotating the drum 22. By selecting the diameter of the various pulleys, one in the art is able to reduce the rotational speed of the drive shaft 16 to achieve the desired rotational speed of the drum shaft 20.

The drive shaft of a 425 horsepower engine utilizing a fluid coupler may turn a drive shaft at revolutions per minute of approximately 2000 or greater. Preferably, the drive shaft rotational speed is reduced by a factor of 4 or 5, resulting in a desired rotational speed of approximately 350 to 600 revolutions per minute of the drum shaft. In such a compost turner, the drive shaft pulley 32 would have a preferred diameter of approximately 14 inches, the first jack shaft pulley 36 would have a preferred diameter of approximately 24 inches, the second jack shaft pulleys 38A, 38B would have a preferred diameter of approximately 9 inches, and the drum shaft pulleys 42A, 42B would have a preferred diameter of approximately 24 inches. One of skill in the art would be able to determine the appropriate number and diameter of pulleys to achieve the desired reduction.

The jack shaft 18 must be of sufficient length and strength to accommodate the requisite belts, bearing assemblies and supports and to handle the loads imposed. Generally, it is advantageous to minimize the length of the jack shaft, which helps to keep the system as compact as possible. In a preferred embodiment of a 425 horsepower compost turner, a jack shaft 18 may be constructed of high strength alloy steel and be approximately 25 to 35 inches in length and approximately 3 to 4 inches in diameter. In the embodiment shown in FIG. 2, a more preferred jack shaft 18 is approximately 29 inches in length and approximately 3½ inches in diameter.

In the embodiment depicted in FIGS. 2–5, the jack shaft 18 is connected at one end to a first jack shaft pulley 36, which is connected by drive shaft belt 34 to drive shaft pulley 32, which is turned by the rotating drive shaft 16. The first jack shaft pulley 36 preferably is positioned at one end of the jack shaft 18. Alternatively, it may be positioned at other locations along the length of the jack shaft 18.

Figure 5:
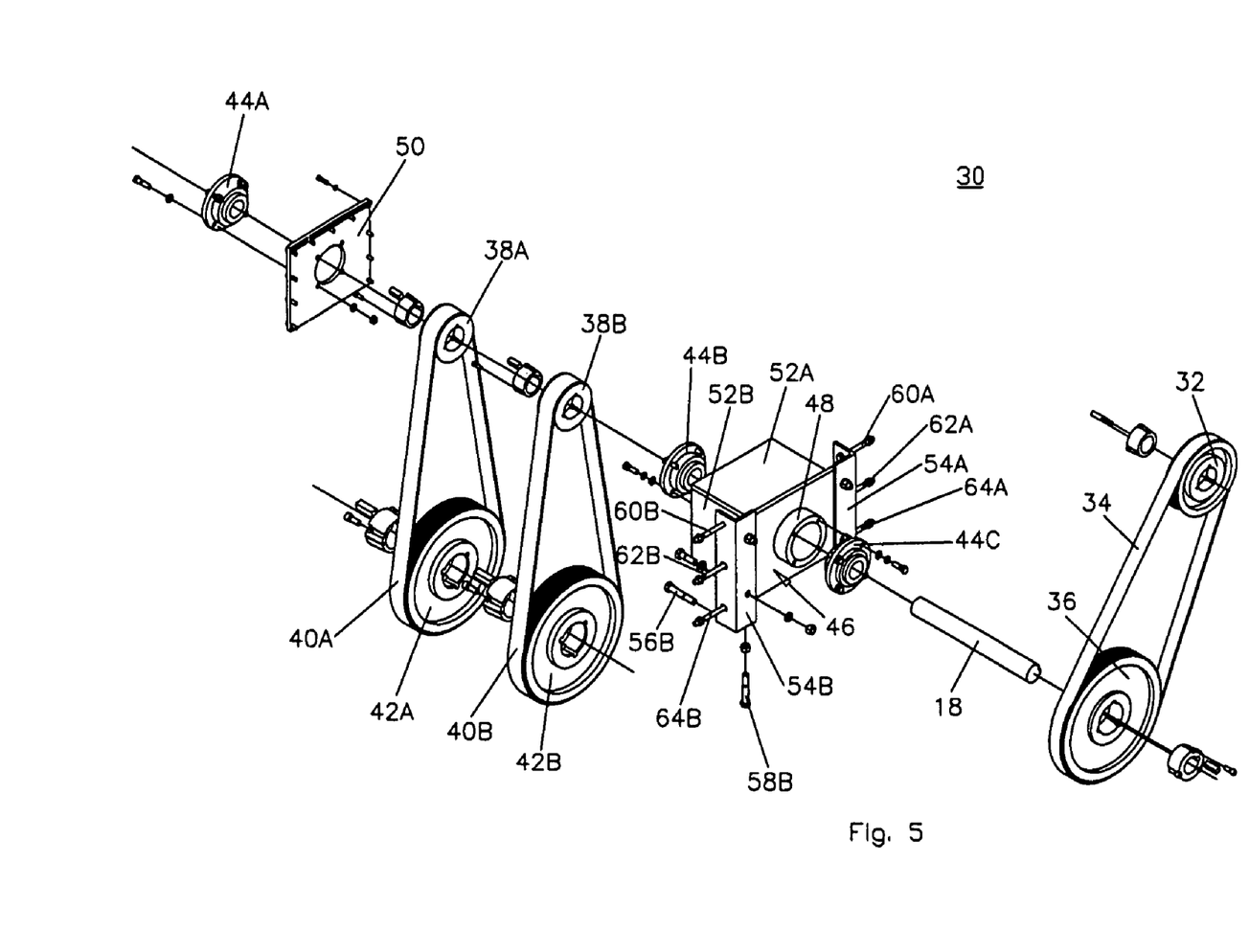
FIG. 5 is an exploded, perspective view depicting a portion of one embodiment of the reduction assembly of FIG. 2.

Jack shaft 18 is rotatably connected to a first bearing assembly 44C, which is also connected to at least a portion of the compost turner. Referring now to FIG. 5, the first bearing assembly 44C is connected to support structure 46, and preferably to a first bearing mount 48 of support structure 46. The support structure 46, including the first bearing mount 48, provides support to the jack shaft 18, the first bearing assembly 44C and any additional bearing assemblies. The first bearing mount 48 is positioned along the length of the jack shaft 18, and preferably is positioned adjacent to, or as close as practicable to, the first jack shaft pulley 36 to maximize the amount of support.

The support structure 46 is connected to a portion of the compost turner, and preferably is adapted to be adjustably connected to a frame of the compost turner. In the embodiment depicted in FIG. 3, support structure 46 is adapted to be connected to the compost turner by bolts 66A, 66B and 68A, 68B, with vertical adjustments provided by the vertical slots (not numbered) on the support structure 46.

The jack shaft 18 also is rotatably connected to a second bearing assembly 44A, which is connected to the support structure 46, and preferably to a second bearing mount 50 of support structure 46. The support structure 46, including the second bearing mount 50, provides support to the jack shaft 18, the first bearing assembly 44C, the second bearing assembly 44A and any additional bearing assemblies. The second bearing mount 50 is positioned along the length of the jack shaft 18, at a position different from that of the first bearing mount 48, and preferably is positioned at or near the end of the jack shaft 18 opposite from the end connected to the first jack shaft pulley 36.

Preferably, the second bearing mount 50 is removably attached to the rest of the support structure 46, e.g., by bolts or other fasteners. This facilitates access to the jack shaft belts 40A, 40B for inspection or replacement without requiring the removal of the jack shaft 18. Alternatively, the second bearing mount 50 may be welded or otherwise attached to the support structure 46.

The second bearing mount 50 preferably is connected to the first bearing mount 48, more preferably by one or more horizontal extensions, such as an arm or a panel. In the preferred embodiment depicted in FIG. 5, the support structure 46 is a box-like structure comprising the first bearing mount 48, the second bearing mount 50, horizontally extending panels 52A, 52B and 52C (not shown, but parallel to and opposite from panel 52B), connectors 54A, 54B, and adjusting and tightening bolts. In this embodiment, the second set of jack shaft pulleys 38A, 38B are positioned along the jack shaft 18 between the first bearing mount 48 and the second bearing mount 50. As such, the support structure 46 is not a closed box, but has an opening large enough to at least allow the jack shaft belts 40A, 40B to extend from the second jack shaft pulleys 38A, 38B to the drum shaft pulleys 42A, 42B. One or more of the panels 52A, 52B, 52C may be removed, and or replaced, with an alternative connecting member between the first bearing mount 48 and the second bearing mount 50. The connecting member is of sufficient strength to connect the first bearing mount 48 and the second bearing mount 50, and preferably of sufficient strength to allow the support structure 46 to be adjustably connected to the compost turner at a single location. In a more preferred embodiment, the support structure 46 is connected to the compost turner by at least a portion of first bearing mount 48, as depicted in FIGS. 2–5.

The support structure 46 may be constructed in a variety of shapes and sizes, including the open-ended box structure depicted in FIG. 2. Preferably, one of the bearing mounts 48 or 50 is connected to a portion of the compost turner and to the other bearing mount. Alternatively, both the first bearing mount 48 and the second bearing mount 50, and any additional bearing mounts, may each be connected to a portion of the compost turner.

The support structure 46 may be constructed of any suitable material that would provide the required support for this application, and preferably is constructed of steel plate, approximately ¾ inches thick. For a compost turner having approximately 425 horsepower, the support structure 46 preferably is approximately 20 inches in length, 15 inches in width and 18 inches in height.

In the embodiment of the invention depicted in FIGS. 2–5, the first bearing mount 48 is adapted to receive two bearing assemblies, 44C and 44B, i.e., a bearing assembly is attached to each side of the first bearing mount 48. Two bearing assemblies at the first bearing mount 48 provide additional support for higher loads and is preferred for compost turners having a capacity of approximately 350 to 600 horsepower. Alternatively, a single bearing assembly at the first bearing mount is preferred for lower capacity compost turners having approximately 200 to 400 horsepower. The single bearing assembly may be attached to either side of the first bearing mount 48, but preferably is attached to the side closest to the first jack shaft pulley 36, which would provide more greater support and reduce the overall size of the support structure 46.

Figure 4:
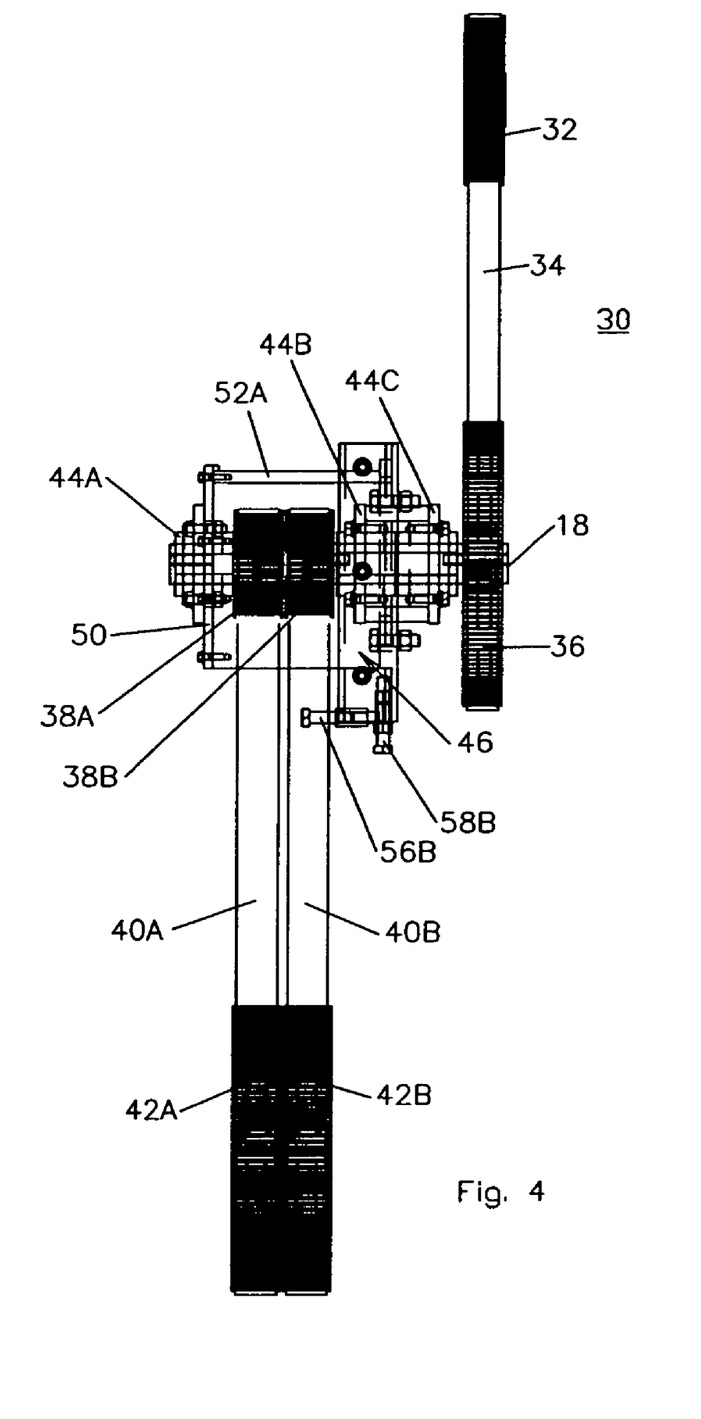
FIG. 4 is a side view depicting a portion of the reduction assembly of FIG. 2.

Similarly, the embodiment depicted in FIGS. 4 and 5 shows a single bearing assembly 44A attached to the outer side of the second bearing mount 50. Alternatively, the bearing assembly 44A may be attached to the inner side of the second bearing mount 50 or a second bearing assembly (not shown) may be attached to the opposite side of the second bearing mount 50.

Additional bearing mounts (not shown) may be employed along the length of the jack shaft 18, in order to provide additional support to the jack shaft 18 and the bearing assemblies. Referring to the embodiment depicted in FIG. 4, by lengthening the jack shaft 18, an additional bearing mount may be added, e.g., between the two second jack pulleys 38A, 38B, and/or further to the outside of second bearing mount 50, and/or further to the outside of first bearing mount 48, such as outside the first jack shaft pulley 36 on the very end of the jack shaft 18. Any or all of such additional bearing mounts may additionally be adapted to house a bearing assembly, or a pair of bearing assemblies. Such an additional bearing mount or mounts may increase the overall size of the gear reduction assembly, but would provide additional support to the jack shaft and the bearing assemblies.

In addition to providing support to the jack shaft 18 and various bearing assemblies, the support structure 46 may be adapted to facilitate the adjustment and tightening of various components of the reduction assembly 30. In general, it is advantageous to reduce the number and complexity of steps required to make such adjustments and tightenings. In the embodiment of the invention depicted in FIGS. 2–5, the support structure 46 includes connectors 54A, 54B, which are adapted to facilitate the adjustment of various components of the reduction assembly 30, to tighten the desired, adjusted position of certain components of the reduction assembly 30 and to adjustably connect the support structure 46 to a portion of the compost turner 10. Alternative structure or structures may provide these functions. Connectors 54A, 54B preferably are located at one location along the longitudinal axis of the support structure 46 and more preferably are located proximate to the first bearing mount 48 or the second bearing mount 50. The connectors may be included as part of the first bearing mount 48, whether as part of a composite piece or as separate, connected pieces. In the preferred embodiment depicted in FIGS. 2–5, the first bearing mount 48 includes connectors 54A, 54B that are removably and adjustably attached to the rest of first bearing mount 48.

Figure 3:
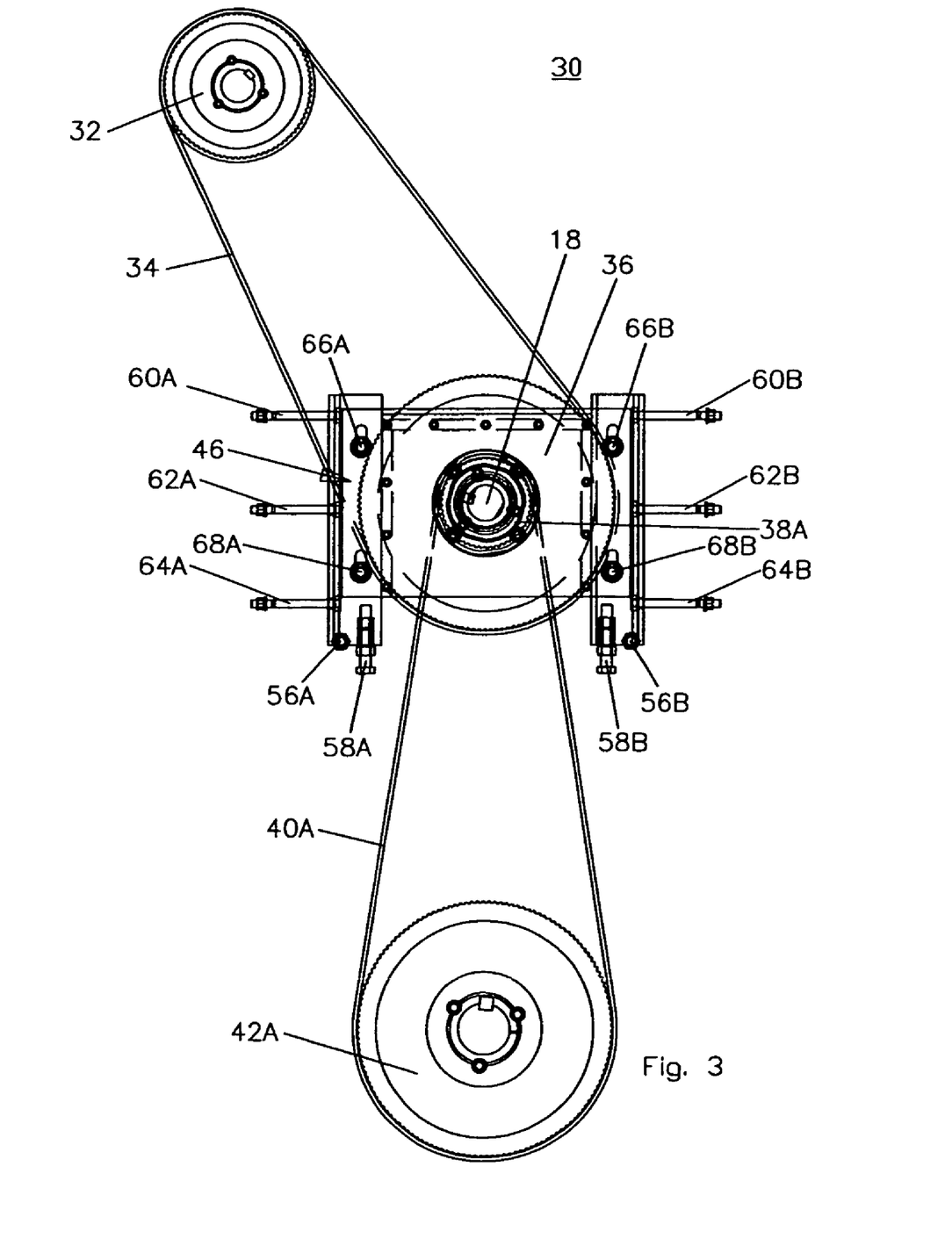
FIG. 3 is a front view depicting a portion of the reduction assembly of FIG. 2.

By locating the connectors 54A, 54B at one location along the longitudinal axis of the support structure 46, the support structure 46 is capable of providing adjustments and tightenings in fewer steps and in a more simplified manner. As shown in FIGS. 3–5, the connectors 54A, 54B are part of first bearing mount 48 and provide adjustment and tightening of various components, without the requirement of additional mechanisms and steps of adjusting and/or tightening at other locations along the jack shaft, such as near the second bearing mount.

Alternatively, connectors 54A, 54B may be located at another position, such as adjacent to, or part of, the second bearing mount 50 or at any other portion of support structure 46. To facilitate adjustments and tightenings, it is preferred that there be one connector or one set of connectors 54A, 54B. Alternatively and less preferably, the support structure 46 may be connected by more connectors and at additional locations, e.g., by a connector or connectors at more than one bearing mount or other positions on the support structure.

For example, it is advantageous to be able to adjust the angle of the jack shaft 18 along its longitudinal axis, in order to attain and maintain parallelism between the jack shaft 18 and the drum shaft 20. This increases the efficient and reliable operation of the jack shaft 18 turning the drum shaft 20. The support structure 46 may be adapted to provide such an adjustment and a tightening to maintain the desired adjustment. In the embodiment depicted in FIGS. 3 and 4, support structure 46 is adapted to receive adjusting bolts 56A, 56B. By tightening or loosening adjusting bolts 56A, 56B, the angle of the support structure 46 along the longitudinal axis of the jack shaft 18 may be changed, which correspondingly changes the angle of the jack shaft 18 along its longitudinal axis. Preferably, the adjusting bolts 56A, 56B are positioned to result in the jack shaft 18 and the drum shaft 20 being essentially parallel.

After the adjusting bolts 56A, 56B, and therefore the support structure 46, are in the desired position, it is preferable to secure those positions, which may be accomplished in a variety of ways. In a preferred embodiment shown in FIGS. 3 and 4, the support structure 46 is adapted to receive tightening bolts 60A, 60B and 62A, 62B and 64A, 64B, which are designed to help maintain the adjustment of the jack shaft 18 provided by the adjusting bolts 56A, 56B.

In addition, it is advantageous to be able to adjust and maintain the tension of the jack shaft belts 40A, 40B. Again, the support structure 46 may be adapted to facilitate such an adjustment and a tightening to maintain the desired adjustment. The support structure 46 enables one to make such a vertical adjustment (to tighten or loosen the jack shaft belts 40A, 40B), without changing the horizontal inclination of the jack shaft 18. This makes such an adjustment more precise, more user-friendly, less complex and less time consuming. In a preferred embodiment depicted in FIGS. 3 and 4, the support structure 46 is adapted to receive adjusting bolts 58A, 58B. By tightening or loosening adjusting bolts 58A, 58B, the vertical position of the support structure 46, and correspondingly the jack shaft 18, may be adjusted to tighten or loosen the tension on the jack shaft belts 40A, 40B to the desired level, without changing or having to change the horizontal inclination of the jack shaft 18.

After the adjusting bolts 58A, 58B, and therefore the support structure 46 and the jack shaft 18, are in the desired position to provide the desired amount of tension of the jack shaft belts 40A, 40B, it is preferred to secure those positions, which may be accomplished in a variety of ways. In a preferred embodiment shown in FIGS. 3 and 4, the support structure 46 is adapted to receive tightening bolts 66A, 66B and 68A, 68B, which are designed to help maintain the tension on the jack shaft belts 40A, 40B provided by the position of the support structure 46 and jack shaft 18 provided by the adjusting bolts 58A, 58B. More preferably, the support structure 46 is adapted to adjustably receive the tightening bolts 66A, 66B and 68A, 68B. For example, in the embodiment shown in FIG. 3, the support structure includes a vertically slotted hole approximately 3 inches long, which allows a vertical adjustment.

Additionally, it is advantageous to be able to adjust and tighten the tension of the drive shaft belt 34. In the embodiment depicted in FIG. 3, the tension of the drive shaft belt 34 is adjusted and tightened, if necessary, by moving the engine carriage. Preferably, such an adjustment and tightening is performed after the support structure 46 has been securely positioned in its desired position, as described above. Alternatively, the support structure 46 may be adapted to provide such an adjustment and tightening.

The foregoing description of the present invention has been presented for purposes of illustration and description. The description is not intended to limit the invention to the form disclosed herein. Consequently, variations and modifications commensurate with the above teachings, and the skill or knowledge of the relevant art, are within the scope of the present invention. The embodiment described herein is further intended to explain the best mode known for practicing the invention and to enable others skilled in the art to utilize the invention in such, or other, embodiments and with various modifications required by the particular applications or uses of the present invention. It is intended that the appended claims be construed to include alternative embodiments to the extent permitted by the prior art.

What is claimed is:

1. A support structure for a jack shaft assembly, comprising:
   a first bearing mount adapted to house a first bearing assembly;
   a first bearing assembly connected to the first bearing mount and adapted to be rotatably connected to a jack shaft;
   a second bearing mount adapted to house a second bearing assembly;
   a second bearing assembly connected to the second bearing mount and adapted to be rotatably connected to a jack shaft; and
   an extension connecting the first bearing mount and the second bearing mount;
   wherein at least one of the first bearing mount, the second bearing mount and the extension is adapted to adjustably connect the support structure to another structure.

2. The support structure of claim 1, wherein the first bearing mount is adapted to house two bearing assemblies.

3. The support structure of claim 1, wherein the second bearing mount is adapted to house two bearing assemblies.

4. The support structure of claim 1, wherein the another structure is a compost turner.

5. The support structure of claim 1, wherein at least one of the first bearing mount, the second bearing mount and the extension is adapted to adjustably connect the support structure to a compost turner in a vertical direction.

6. The support structure of claim 1, further comprising means to connect the support structure to a compost turner and means to adjust a vertical positioning of the support structure relative to a compost turner.

7. The support structure of claim 1, wherein at least one of the first bearing mount, the second bearing mount and the extension is adapted to adjustably connect the support structure in a horizontal direction.

8. The support structure of claim 1, further comprising means to connect the support structure to a compost turner and means to adjust the horizontal inclination of the support structure relative to the compost turner.

9. The support structure of claim 1, wherein at least a portion of the second bearing mount is removably connected to the extension.

10. The support structure of claim 1, further comprising,
 means to connect the support structure to a compost turner;
 means to adjust a vertical positioning of the support structure relative to the compost turner; and
 means to adjust a horizontal positioning of the support structure relative to the compost turner.

11. The compost turner of claim 10, wherein at least a portion of the second bearing mount is removably connected to the extension.

12. A reduction assembly for a compost turner, comprising:
 a drive shaft;
 a jack shaft;
 a drum shaft;
 a first belt connecting the drive shaft and the jack shaft;
 a second belt connecting the jack shaft and the drum shaft;
 a support structure adapted to be connected to a compost turner, the support structure comprising,
  a first support member adapted to house a first bearing assembly;
  a first bearing assembly connected to the first support member and rotatably connected to the jack shaft at a first position along the length of the jack shaft;
  a second support member adapted to house a second bearing assembly;
  a second bearing assembly connected to the second support member and rotatably connected to the jack shaft at a second position along the length of the jack shaft; and
  an extension connecting the first support member and the second support member.

13. The reduction assembly of claim 12, wherein the second belt is rotatably connected to the jack shaft at a position between the first position of the first support member and the second position of the second support member.

14. The reduction assembly of claim 12, wherein the first belt is rotatably connected to the jack shaft at a position between the first position of the first support member and the second position of the second support member.

15. The reduction assembly of claim 12, further comprising a third bearing assembly connected to the first support member and rotatably connected to the jack shaft.

16. The reduction assembly of claim 12, further comprising a third bearing assembly connected to the second support member and rotatably connected to the jack shaft.

17. The reduction assembly of claim 12, at least one of the first support member the second support member and the extension is adapted to adjustably connect the support structure to a compost turner.

18. The reduction assembly of claim 12, wherein the support structure further comprises means for adjusting the position of the support structure relative to a compost turner.

19. The reduction assembly of claim 12, wherein the support at least one of the first support member, the second support member and the extension is adapted to adjust the horizontal inclination of the jack shaft along the longitudinal axis.

20. The reduction assembly of claim 12, wherein the support structure further comprises means for adjusting the horizontal inclination of the jack shaft along the longitudinal axis.

21. The reduction assembly of claim 12, wherein at least one of the first support member, the second support member and the extension is adapted to adjust the tension of at least one of the first belt and the second belt.

22. The reduction assembly of claim 12, wherein the support structure further comprises means to adjust the tension of at least one of the first belt and the second belt.

23. The reduction assembly of claim 12, further comprising a third support member adapted to house a third bearing assembly and rotatably connected to the jack shaft at a third position along the length of the jack shaft.

24. The reduction assembly of claim 12, wherein at least a portion of the second support member is removably connected to the extension.

25. The reduction assembly of claim 12, wherein the support structure further comprises means for adjusting the positioning of the support structure relative to a compost turner in at least two directions.

26. The reduction assembly of claim 25, wherein at least a portion of the second bearing assembly is removably connected to the extension.

27. A compost turner, comprising
 a drive shaft;
 a drive shaft pulley connected to the drive shaft and adapted to receive a drive shaft belt;
 a jack shaft;
 a first jack shaft pulley connected to the jack shaft at a first position and adapted to receive a drive shaft belt;
 a drive shaft belt connected to the drive shaft pulley and to the first jack shaft pulley;
 a second jack shaft pulley connected to the jack shaft at a second position and adapted to receive a jack shaft belt;
 a drum shaft;
 a drum shaft pulley connected to the drum shaft and adapted to receive a jack shaft belt;
 a jack shaft belt connected to the second jack shaft pulley and to the drum shaft pulley;
 a support assembly connected to the compost turner, comprising
  a first support;
  a first bearing assembly connected to the first support and adapted to be rotatably connected to the jack shaft;
  a second support;
  a second bearing assembly connected to the second support and rotatably connected to the jack shaft;
  a member connecting the first support and the second support.

28. The compost turner of claim 27, wherein the support assembly is adjustably connected to the compost turner.

29. The compost turner of claim 27, wherein the support assembly further comprises means for adjusting the vertical positioning of the support assembly relative to the compost turner.

30. The compost turner of claim 27, wherein the support assembly further comprises means for adjusting the horizontal inclination of the jack shaft along the longitudinal axis.

31. The compost turner of claim 27, wherein the support assembly further comprises means for adjusting the tension of at least one of the jack shaft belt and the drive shaft belt.

32. The compost turner of claim 27, wherein at least a portion of the second support is removably connected to the member.

33. The compost turner of claim 27, wherein the support assembly further comprises, means for adjusting the horizontal inclination of the jack shaft along the longitudinal axis, and means for adjusting the tension of at least one of the jack shaft belt and the drive shaft belt.

34. The compost turner of claim 33, wherein at least a portion of the second support is removably connected to the member.

\* \* \* \* \*